(12) United States Patent
Fujita (10) Patent No.: US 6,309,743 B1
(45) Date of Patent: Oct. 30, 2001

(54) PARTIALLY COMPOSITE LIGHTWEIGHT METAL PRODUCT AND PREFORM FOR PRODUCING THE SAME

(75) Inventor: Makoto Fujita, Hiroshima (JP)

(73) Assignee: Mazda Motor Corporation, Hiroshima-ken (JP)

( * ) Notice: Subject to any disclaimer, the term of this patent is extended or adjusted under 35 U.S.C. 154(b) by 0 days.

(21) Appl. No.: 09/406,370

(22) Filed: Sep. 28, 1999

(30) Foreign Application Priority Data

Sep. 30, 1998 (JP) .................................................. 10-279031

(51) Int. Cl.⁷ ........................................................ B32B 5/22
(52) U.S. Cl. ..................................... 428/317.9; 428/313.7; 428/313.9
(58) Field of Search .............................. 428/313.7, 313.9, 428/317.9

(56) References Cited

U.S. PATENT DOCUMENTS 5,648,620  7/1997  Stenzel et al. .
5,727,511  3/1998  Omura et al. .
6,165,605 * 12/2000  Fujita et al. ...................... 428/312.8

FOREIGN PATENT DOCUMENTS 0 992 307 A1  4/2000  (EP) .
06182524      7/1994  (JP) .
07108370      4/1995  (JP) .

* cited by examiner

Primary Examiner—Blaine Copenheaver
Assistant Examiner—Leanna Roché
(74) Attorney, Agent, or Firm—Brooks & Kushman P.C.

(57) ABSTRACT

A porous preform for manufacturing partially composite lightweight metal products including at least a sliding surface as composite part is made of a hard material which comprises a sintered mixture comprising $TiO_2$ particles, short ceramic fibers and whiskers, and SiC particles having an average particle size of approximately 20 to 100 $\mu$m. The partially composite lightweight metal product produced from the porous preform is provided with superior wear resistance and high strength and achieves increasing the coefficient of friction even though it is large in size, so as to keep a composite part of the composite lightweight metal product such as a sliding surface of a brake rotor remain even and smooth for a long period of time.

6 Claims, 6 Drawing Sheets

PARTIALLY COMPOSITE LIGHTWEIGHT METAL PRODUCT AND PREFORM FOR PRODUCING THE SAME

BACKGROUND OF THE INVENTION

1. Field of the Invention

The present invention relates to partially composite lightweight metal products that are used where there are demands for superior abrasion resistance and strength as such as a break rotor or the like for vehicles, and to a porous preform which is used to produce the partially composite lightweight metal products.

2. Description of Related Art

In regards to components, such as a break rotor or the like for vehicles, which call for high wear resistance, casting iron has been typically used. The adaptability of various materials has been tried from the view point of improving the braking ability of a vehicle through an improved cooling down performance and an heightened friction coefficient of the break rotor together with improving the running stability through a reduction in non-suspended weight, i e. the weight of components such as wheels beneath chassis springs, by using lightweight products.

As one of these technologies, an aluminum alloy ingot in which SiC particles are dispersed is used to make products such as brake rotors by sand mold casting or metal mold casting. Such a break rotor has been employed in electric cars, sports cars and the like. However, there is the following sort of problems wherein room for further improvement remains even if applying the aluminum alloy ingot to the brake rotor. In this sort of technology, since SiC, which is a ceramic, is at a less choice of particle volumes and sizes, there is a limit to increasing the coefficient of friction of the brake rotor. In addition, in this sort of technology, it is necessary to use a base material that has favorable affinity with SiC. While an aluminum alloy that corresponds to AC4C is employed as the base material from this point of view, the utilization of an aluminum alloy as the base material causes the problem in that the useful limiting temperature drops. In particular, the break rotor suffers about 450° C. during braking and wears soon which is the problem to be solved. Moreover, since the product which has high wear resistance is hardly workable because it contains reinforcements all over, not only the cost of material of the product is high, but the cost of machining the product is also high.

In recent years, there has been proposed, as one of methods of producing partially composite products of which only part (for example, a sliding surface section) of a product is made to as a composite part for reinforcement, to prepare a porous preform having specified shape of continuous pores first, impregnate the porous preform with a molten lightweight metal and pressurize the molten lightweight metal to fill it in the pores of the porous preform. There have been various proposals of porous preforms used in the method of producing partially composite products and a method of producing the porous preform.

One of such a porous preform, that is known from, for example, Japanese Laid-Open Patent Application No. 7-108370, contains $TiO_2$ and inorganic fibers. Another porous preform, that is known from, for example, Japanese Laid-Open Patent Application No. 6-182524, contains aluminum borate whiskers, sodium silicate, and silicon carbide.

The prior art porous preform is hardly adaptable to one which is applied to products having a demand for superior wear resistance and high strength such as a break rotor and expected to be improved at characteristics as matters stand. That is, even though applying the prior art porous preform to partially composite lightweight metal products such as a break rotor, such a partially composite lightweight metal product suffers irregularities generating on its sliding surface relatively soon, which leads to a cause of generating noises and vibrations or shudders. In the case where a porous preform such as described above is used to manufacture partially composite lightweight metal products, it is typical to pour a molten lightweight metal such as a molten aluminum alloy in a cavity of a metal mold with the porous preform set therein and fill in the pores of the porous preform so as thereby to tuck up and cover the porous preform with the molten lightweight metal. However, the prior art preform porous bodies are intended to be applied to manufacturing relatively small products, and, even if attempted to manufacture partially composite lightweight metal products that are applied to relatively large sizes of parts such as a break rotor, they suffer such a problem that the product is apt to form non-composite portions easily due to insufficient impregnation of the molten lightweight metal in the pores, as a result of which the final product, i.e. the brake rotor, experiences aggravation of wearing characteristics and strength.

SUMMARY OF THE INVENTION

The present invention has, therefore, a primary object to provide a partially composite lightweight metal product which, even though having a relatively large size, shows superior wear resistance and high strength along with heightening its coefficient of friction and moreover is able to keep the surface quality to remain even and smooth over a long period of time.

The present invention has another object to provide a partially composite lightweight metal product most suitable as a material for break rotors.

The present invention has still another object to provide a porous preform for manufacturing this type of partially composite lightweight metal product.

The foregoing objects of the invention are accomplished by providing a porous preform made of a hard material and having a number of pores for manufacturing a partially composite lightweight metal product which includes at least a sliding surface formed as composite part. The hard material comprises a low mixture which contains at least $TiO_2$ particles, at least one of short ceramic fibers and whiskers and SiC particles which has an average particle size of approximately 20 to 100 $\mu$m and is sintered.

The pores of the porous preform are preferred to be continuous and may, however, be non-continuous partly. The porous preform has a structure in which the SiC particles are sintered in the $TiO_2$ particles in the form of what is called a sea-island structure and these $TiO_2$ particles and SiC particles are adhered to the short ceramic fibers or whiskers.

The pores of the porous preform are preferred to be continuous and may, however, be nun-continuous partly. The porous preform has a structure in which the SiC particles are sintered in the $TiO_2$ particles in the form of what is called a sea-island structure and these $TiO_2$ particles and SiC particles are adhered to the short ceramic fibers or whiskers.

The raw mixture is preferred to contain 2 to 20% in volume fraction of $TiO_2$ particles and 10 to 30% in volume fraction of SiC particles.

A partially composite lightweight metal product is produced by filling the pores of the porous preform with a molten lightweight metal.

BRIEF DESCRIPTION OF THE DRAWINGS

The above and other objects and features and advantages of the present invention will be clearly understood from the following description with respect to the preferred embodiment thereof when considered in conjunction with the accompanying drawings, in which.

DETAILED DESCRIPTION OF THE PREFERRED EMBODIMENT

The inventor of this application introduced investigation from various angles, of porous preforms which enables manufacturing partially composite lightweight metal products of which a sliding surface is kept to remain unchanged in condition and properties over a long period of time. As a result, it was proved that, when adding (1) $TiO_2$ particles, (2) short ceramic fibers and/or whiskers, and (3) SiC particles in appropriate combination to a material of a porous preform, the surface of the partially composite lightweight metal product was made more even and smooth after rubbing tests as the SiC particles have relatively larger particle sizes. That is to say, although, in the case where SiC particles are added to a porous preform, it had been typical to make use of SiC particles having a particle size of around 10 $\mu$m from the view point of dispersion ability, the inventor of this application accomplished the invention from the fact that evenness and smoothness of a sliding surface could be maintained more satisfactorily in the case where SiC particles had a relatively large size greater than 20 $\mu$m than in the case where SiC had a smaller particle size of 10 $\mu$m, which was revealed as a result of evaluation with regards to a change in coefficient of surface friction $\mu$ after rubbing tests of the surfaces of brake rotors (partially composite light weight metal products) made by impregnating various porous preforms made of the raw materials (1)–(3) in various combinations with an aluminum alloy.

The porous preform of the present invention was made by sintering a raw material that contained (1) $TiO_2$ particles, (2) short ceramic fibers and/or whiskers, and (3) SiC particles with an average particle size of 20 to 100 $\mu$m as its essential components. Effects of these components are summarized below.

$TiO_2$ particles forms a basic hard material of the porous preform of the invention, and is necessary for the porous preform to secure its strength. In addition, addition of even a small content of $TiO_2$ particles is effective in maintaining evenness and smoothness of a friction surface of a partially composite lightweight metal product. In order to demonstrate this effect, while it is desirable to have TiO particles contained more than two percent in volume fraction (Vf), it is strongly preferred to be less than 20% in volume fraction for the reason to secure gas permeability which is needed to make it relatively easy to manufacture a partially composite product in a squeeze casting even when the content of $TiO_2$ particles increases. Since the $TiO_2$ particle size does not provide influence to various characteristics of the porous preform, it does not matter how large the particle size is and the utilization is ordinarily made of particles of approximately 0.3 $\mu$m. It is noted that the volume fraction Vf refers to the percent of a volume of specific particles relative to an entire volume of a porous preform. Letting $V_1$ and $V_0$ be an entire volume of a porous preform including pores and a total volume of the pores, respectively, the volume of a hard material is given by $(V_1-V_0)$. Thus, the volume fraction Vf of the hard material relative to the whole porous preform is given by $(V_1-V_0)/V_1$. In the case where a porous preform of the invention is produced by a method that will be described later, the porous preform is almost free from volume shrinkage after sintering, so that the volume fraction Vf can be calculated from an apparent density of a finely filled and vacuum extracted mixture and weight and apparent densities of components of the mixture. The volume fraction Vf in percentage will be hereafter labeled simply by Vf %. Short fibers, whiskers and the like which are contained in a hard material form necessary components that constructs a skeleton of a porous preform. Aluminum fibers, SiC fibers and the like with a fiber diameter of about 2 to 10 $\mu$m and a fiber length of about 200 to 300 $\mu$m are utilized as this sort of short fibers, and aluminum borate whiskers with a fiber diameter of around 2 to 10 $\mu$m and a fiber length of around 10 to 30 $\mu$m are utilized. As stated above, SiC particle is one of materials effective in maintaining evenness and smoothness of a sliding surface of a product when having a particle size of 20 $\mu$m or larger and useful for achieving an increased coefficient of friction of a partially composite lightweight metal product such as a break rotor. In order to exhibit these effects, while it is desirable for the porous preform to contain SiC particles at least 2 Vf %, it is strongly preferred to be less than 30 Vf % for the reason to secure gas permeability which is needed to make it relatively easy to manufacture a partially composite product in a squeeze casting even when the content of SiC particles increases, likely $TiO_2$ particles. In regards to an upper limit of particle size of SiC particles, it is 100 $\mu$m at largest in the light of necessity of uniform dispersion in the porous preform.

Component materials of the porous preform of the present invention include particles of $TiO_2$ and SiC as ceramic particles. These particles exist in a preform such as to provide a texture of the preform in which SiC particles are sintered in $TiO_2$ in the form of a sea-island structure. As a result of having this structure, the preform is provided with a sufficient strength. In addition to those component materials mentioned above, the preform may contain ceramic particles such as $Al_2O_3$ particles and the like in addition to the above mentioned particles if necessary. Each of the short ceramic fiber and the whiskers described above is such that ceramic particles cling onto the ceramic fiber surface or the whisker surface.

Although the porous preform of the present invention is comprised of a hard material as a basic constituent material as described above, it may be produced by sintering a material added with a sintering aid, a burnable powder for adjusting a volume fraction, an inorganic binder and/or a flocculent. The sintering aid forms a compound through a reaction with ceramic particles at a relatively low temperature of around 1100° C., and may specifically be a carbonate of $CaCO_3$ or the like and a metal oxide of CaO, MgO, $Al_2O_3$ or the like. The volume adjusting burnable powder may be particles such as, for example, resin powders of polypropylene, polyethylene or polyacrylamide and graphite powders that burn and disappear at the sintering temperature. In view of the easiness of burning and disappearing, the graphite powders are desirably selected. The addition of such burnable and disappearing powder increases a void content of the porous preform while maintaining the strength of the porous preform, which enables easy to manufacture a partially composite product by use of the porous preform. Colloidal substances such as a silica gel and alumina sol are used as the inorganic binder. A polyacrylamide gel is used as the flocculent. Further, it is acceptable to add the mixture form which the porous preform is produced with an additive such as of an ammonium sulfate or the like.

Figure 1:
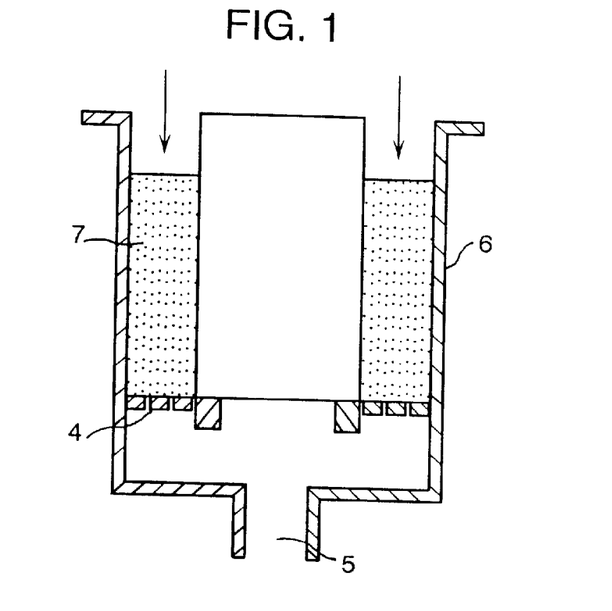
FIGS. 1 and 2 are schematic illustrations for showing a process of forming a porous preform of the invention.
Figure 2:
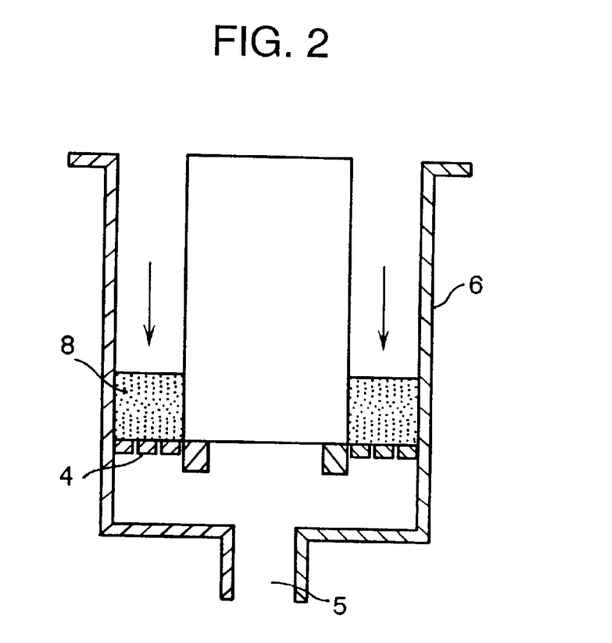

Referring to the drawings in detail and, in particular, to FIGS. 1 through 4, in producing the porous preform of the present invention, a slurry 7 is prepared by providing a stirred mixture of a hard material containing $TiO_2$ particles, short ceramic fibers and/or whiskers and SiC particles and a sintering aid in a dispersion medium or carrier fluid such as water and adding the mixture with a volume adjusting burnable and disappearing powder and an inorganic binder when necessary or a flocculent. Then, the slurry 7 is put into a container 6 which is provided with a filtering wall 4 at its lower section and formed with a vacuum extraction port 5 at its bottom as shown in FIG. 1, and the carrier fluid is vacuum extracted from the slurry 7 through the vacuum extraction port 5 to leave a dehydrated mixture 8 as shown in FIG. 2. Subsequently, the dehydrated mixture 8 is heated at a temperature of around 600° C. to burn and remove the volume adjusting burnable and disappearing powder such as comprising a graphite powder and, thereafter, dried. Further, the dehydrated mixture 8 is heated at an increased temperature to promote sintering of the hard material comprising ceramic particles by the sintering aid, so as to form a porous preform for a brake rotor which comprises a porous body with high air permeability and superior wear resistance. Dimensions of a porous preform for a brake rotor are shown by example in FIG. 3.

For example, in the case that $CaCO_3$ is employed as the sintering aid, $CaCO_3$ particles are decomposed into CaO particles and $CO_2$ gas at a temperature of around 900° C., and the CaO particles react the ceramic particles comprising $TiO_2$ particles to produce an oxide component, namely $CaTiO_3$. This oxide component, i.e. $CaTiO_3$, can be generally sintered at temperatures lower than the sinterable ceramic. In consequence, it can be done to firmly combine the $CaTiO_3$ that has been sintered at a temperature of around 1100° C. with the hard ceramic particles comprising SiC. Accordingly, even in the case where multiple types of ceramic particles which have differing characteristics are combined in the porous preform as the hard material, the porous preform still has an increased void content, so as to make it easy to manufacture a partially composite product and is enabled to be large in size while ensuring handiness. In this way, by means of a ceramic newly formed resulting from a reaction of the ceramic particles with the sintering aids, the ceramic particles and the skeleton forming material fuse and are sintered at their connecting points, so that a porous preform with a number of continuous pores which comprise gaps is produced. The combined sintering aid that comprises carbonates or metal oxides exist as a compound made from reaction to part of the ceramic particles in the porous preform. In the case where the volume adjusting burnable and disappearing powder comprising a graphite powder is combined, the graphite powder is burn out and discharged in the form of CO or $CO_2$ out of the porous preform during sintering, the porous preform is provided pores where there were the graphite powders, so as thereby to have an increased void content.

It is desirable that the sintering temperature is at a level which enables ceramic particles to be sintered. In the case where employed ceramic particles of $TiO_2$ have a particle size of 0.2 to 1 $\mu$m, the sintering of the ceramic particles is accomplished at a temperature higher than 1000° C. or, preferably, between 1000 and 1200° C., within around two hours. In the case where powders other than a graphite powder are employed as the volume adjusting burnable and disappearing powder, the powder starts to burn from a temperature of approximately 600° C. and are discharged in the form of CO or $CO_2$ out of the porous preform during sintering, so as thereby to disappear. When other additives such as an inorganic binder are combined, the inorganic binder works together with the ceramic particles to form a skeletal structure of the porous preform.

The following description will be directed to a method of manufacturing a partially composite lightweight metal product, namely a break rotor, by use of the porous preform produced as above.

Figure 4:
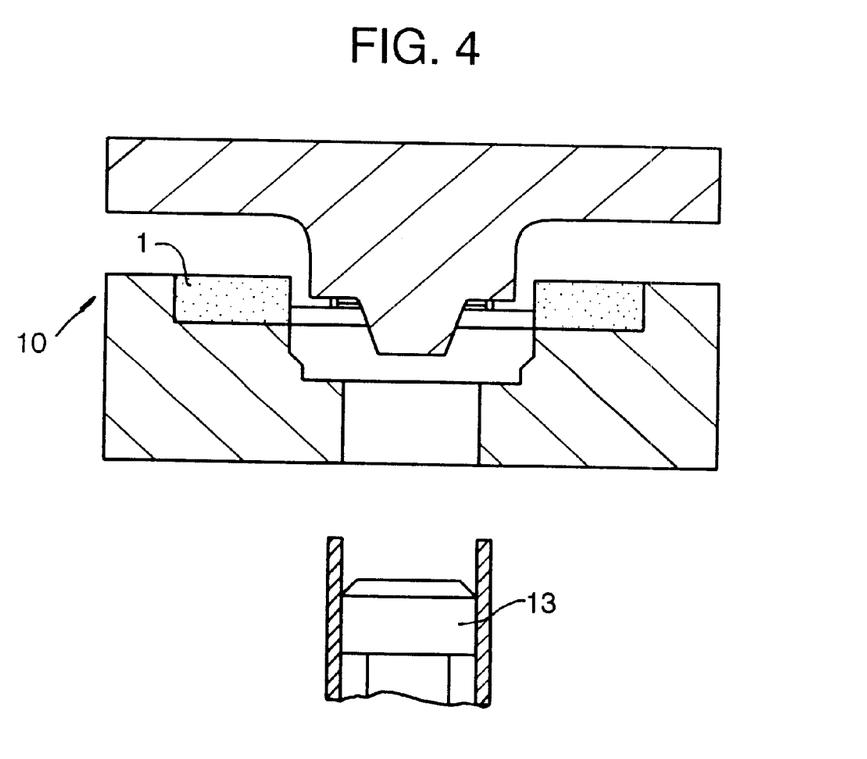
FIGS. 4 and 5 are schematic illustrations for showing a process of producing a partially composite lightweight metal product of the present invention.
Figure 5:
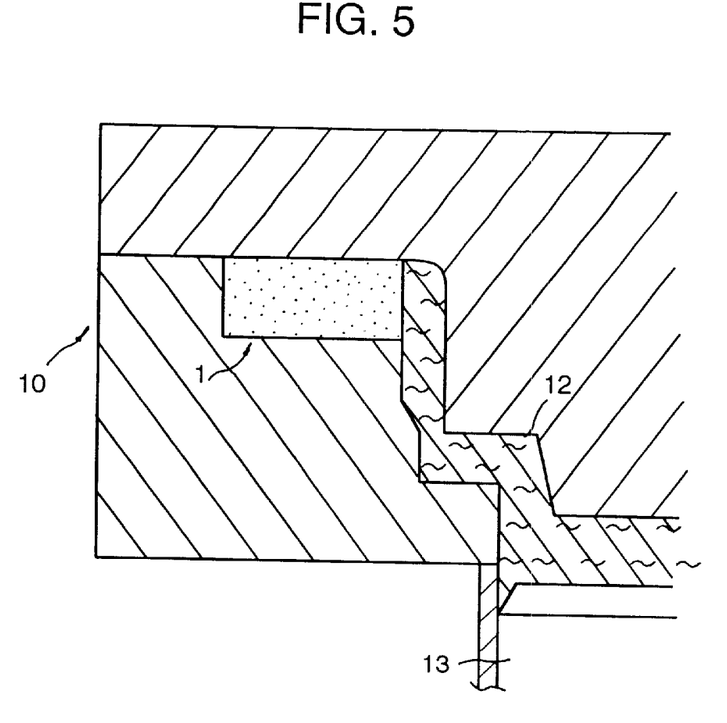

Referring to FIGS. 4 and 5 which show the process of producing a brake rotor, the porous preform 1 is set inside a metal mold 10 as shown in FIG. 4, and a pressurized molten lightweight metal 12 such as a molten aluminum, which is a base material of a porous preform to be produced, is injected into the porous preform 1 by a piston 13 as shown in FIG. 5. As a result, the molten lightweight metal 12 is impregnated into pores of the porous preform 1 with a high efficiency, so as to provide a partially composite lightweight metal product of which the porous preform is properly and entirely tucked up and covered with the molten lightweight metal. Aluminum, aluminum alloys, magnesium alloys and the like may be employed as the lightweight metal for the partially composite lightweight metal product of the present invention.

An aluminum composite material in which TiO and SiC are contained as a reinforcement (a porous preform) is assumed to produce a Ti—Al—Si compound due to a heat treatment such as liquidizing treatment (T4 solution heat treatment). From the fact that this compound has properties in which it is apt to easily adhere to a brake pad which is mated with the break rotor, applying the heat treatment is thought as an effective process in light of achieving increasing the coefficient of friction of the partially composite lightweight metal product, i.e. the brake rotor. However, in the case of applying such heat treatment, when the porous preform is added with $CaCO_3$ as the sintering aid, since $TiO_2$ reacts to CaO, which is a stable oxide produced by decomposition of $CaCO_3$, to become $CaTiO_3$, reaction does not occur between the $TiO_2$ and Al and/or Si even when applying the heat treatment to the porous preform. Therefore, in the case of applying a heat treatment to an aluminum composite material, it is desirable to produce a porous preform without adding the aluminum composite material with $CaCO_3$ as a sintering aid. In this case, although it is possibly expected that the porous preform experiences a drop in strength, sufficient strength can be secured by making the SiC particles content 5 Vf % or above. Also in the light of improving the adhesion ability of the brake rotor to the brake pad, it is desirable to make the Ti content 2 Vf % or above.

As a result of a study with respect to an aluminum brake rotor having a composite disk which was reinforced with a material such as ceramic particles, short fibers and whiskers in order to lower the non-suspended weight of a vehicle, made by the inventor of the invention, it has been found that, after buff-polishing a sliding surface of the brake rotor, applying etching to the polished sliding surface of the brake rotor was effective to achieve increasing the coefficient of friction of the sliding surface of the break rotor at the initial period of friction. If the sliding surface of this sort of aluminum break rotor is only machined, since aluminum of the base material of the sliding surface is soft as compared to hard ceramic particles and short fibers, these hard ceramic particles and short fibers are in a state in which they are covered by the base material. From the study, it was thought that the aluminum adhered to the surface of the brake pad in an initial period of slide movement between the brake rotor and the brake pad which caused aggravation of frictional contact therebetween in that initial period so as to make it hard to achieve increasing the coefficient of friction of the sliding surface of the brake rotor. In the light of the assessment, it was thought that increasing the coefficient of friction of the sliding surface of the brake rotor was achieved by uncovering and removing the aluminum over the hard ceramic particles and short fibers which enabled the hard particles to be brought into frictional contact with the braking pad in the initial period of sliding movement between the brake rotor and the brake pad.

The effect will be more specifically demonstrated with regard to the following embodiments of the present invention to which the present invention is not limited and may be changed in design subjected to the light of the foregoing scope of the invention.

EXAMPLE

Figure 3:
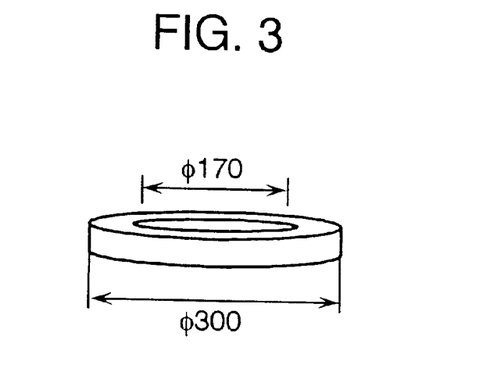
FIG. 3 is a schematic explanatory view showing an example of an outer appearance of a porous preform for manufacturing a brake rotor, in which dimensions are expressed by mm unit.

Porous preforms for a brake rotor shown in FIG. 3 were made of various raw materials which were prepared by mixing SiC particles and $TiO_2$ particles in proportions indicated in Table below and combining various components shown below. The $TiO_2$ particle had an average particle size of 0.3 μm. The porous preform was sintered for three hours at a temperature of 1140° C.

Combined Components
  Skeletal Forming Materials:
  Alumina short fibers (3.0 Vf %)
  Aluminum borate whiskers (3.0 Vf %)
  Sintering Aids:
  $CaCO_3$ (1.0 Vf %)
  Others:
  Alumina sol (proper quantity)
  Polyacrylamide gel (proper quantity)

TABLE

| SiC size | SiC Vf % ($TiO_2$ Vf %) | | |
|---|---|---|---|
| 5 μm | 6% (6%) | 12% (6%) | 22% (6%) |
| 12 μm | 6% (6%) | 12% (2% and 6%) | 22% (8%) |
| 25 μm | 12% (6%) | 12% (2% and 6%) | 22% (8%) |
| 35 μm | 12% (6%) | 12% (6%) | 22% (8%) |

Aluminum brake rotors were produced by casting partially composite products of the porous preforms thus prepared with a molten aluminum alloy. The aluminum composite brake rotors were subjected to rubbing tests in a temperature range between 100 to 400° C. in order to figure out various properties of the aluminum composite brake rotors. The rubbing test was carried out by rubbing the brake rotor with a brake pad material TS-16 (trade name) supplied by Nisshinbo Co., Ltd.

Figure 6:
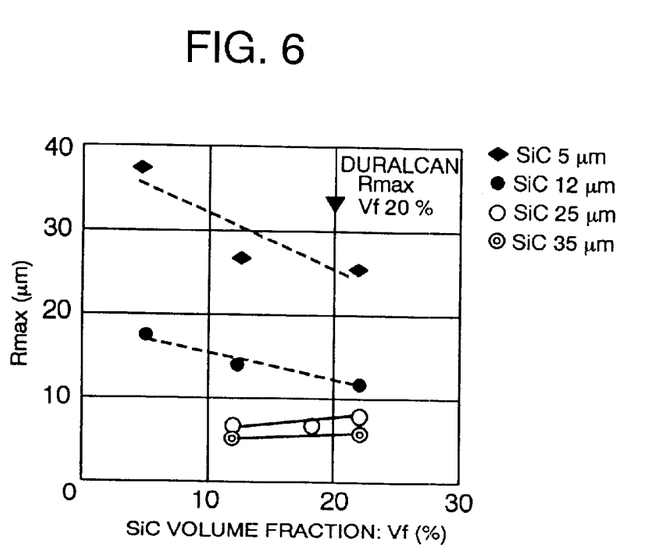
FIG. 6 is a graphical diagram showing the relationship between SiC volume fraction and maximum surface roughness (Rmax) of a brake rotor as a partially composite lightweight metal product.
Figure 7:
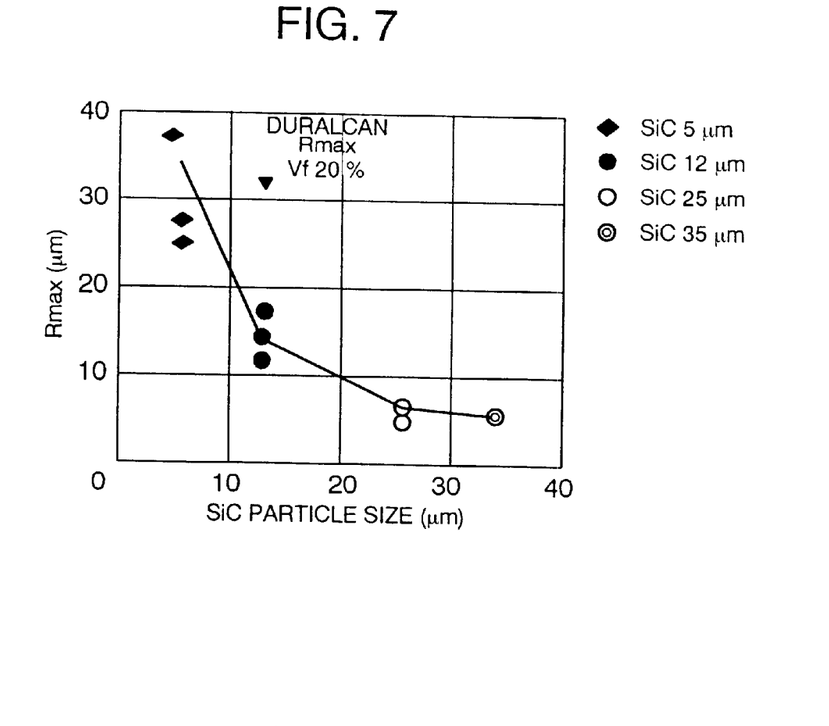
FIG. 7 is a graphical diagram showing the relationship between SiC particle size and maximum surface roughness (Rmax) of the brake rotor.
Figure 8:
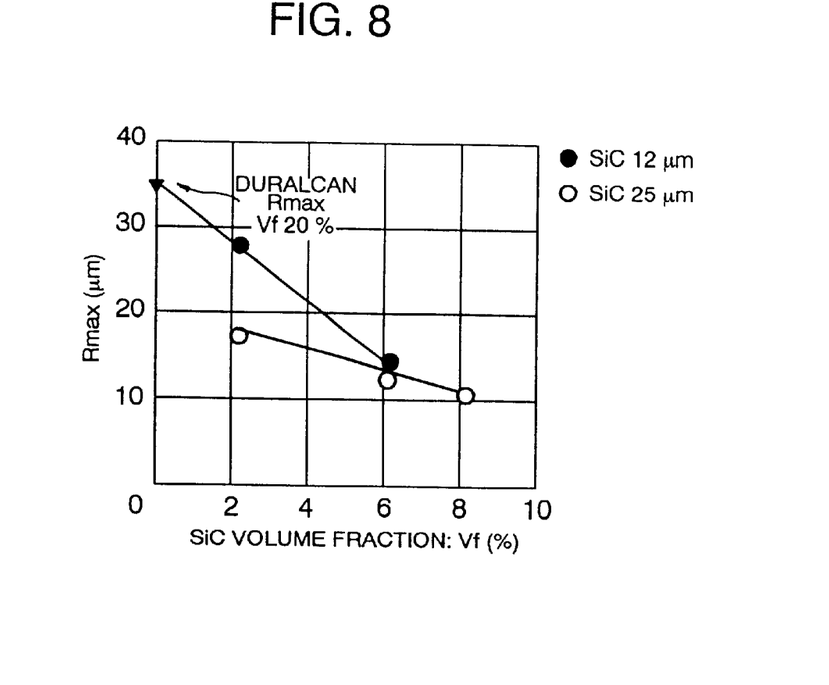
FIG. 8 is a graphical diagram showing the relationship between SiC volume fraction and maximum surface roughness (Rmax) of the brake rotor.

Investigation was made as to influences that SiC volume fractions, SiC particle sizes, $TiO_2$ component exerted on the surface roughness of sliding surfaces of the aluminum brake rotors (Rmax) after the rubbing test. The results are shown in FIGS. 6 to 8. In FIGS. 6 to 8 also show the results of rubbing tests applied to a brake rotor made of a Duralcan material (trade name), which contained an additive of 20 Vf % SiC reinforcement particles having a particle size of around 10 μm, by molten metal stirring casting.

Figure 9:
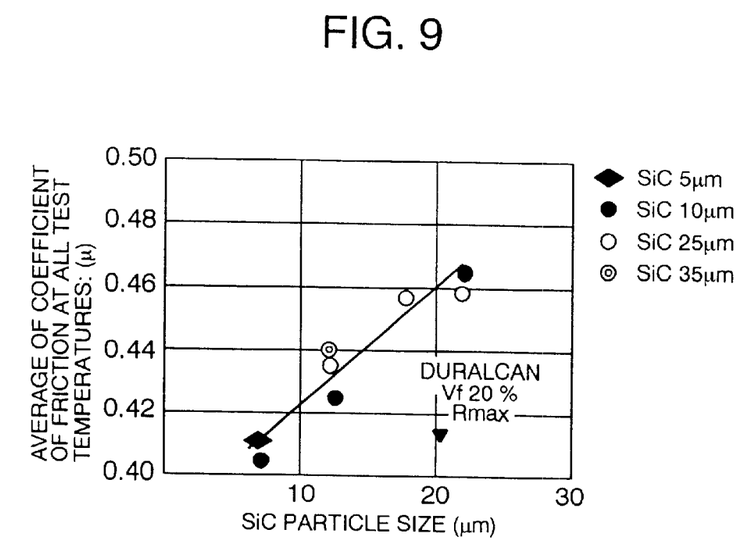
FIG. 9 is a graphical diagram showing the influence that SiC particle size exerts on the coefficient of friction $\mu$, i.e. an average coefficients of friction at all test temperatures.

As apparent from FIG. 6 which shows the relationship between SiC volume fraction and maximum surface roughness (Rmax) for 2 to 6 Vf % $TiO_2$ particles, it is revealed that the raw material which contains more than 10 Vf % SiC particles having a particle size of 25 μm provides the surface roughness (Rmax) remaining small. As apparent from FIG. 7 which shows the relationship between SiC particle size and maximum surface roughness (Rmax) for 2 to 6 Vf % $TiO_2$ particles, it is revealed that the raw material which contains SiC particles having a particle size of larger than 20 μm provides the surface roughness (Rmax) remaining small. Referring to FIG. 8 which shows the relationship between $TiO_2$ volume fraction and maximum surface roughness (Rmax) for 18 to 22 Vf % SiC particles, it is revealed that the surface roughness (Rmax) is kept small by adding only a small amount of but more than 2 Vf % of $TiO_2$ particles. FIG. 9 is a graph which shows the influence that SiC volume fractions exert on the coefficient of friction $\mu$ (an average of the coefficients of friction at all test temperatures). It is revealed that the coefficient of friction $\mu$ has a greater dependency to volume fraction than SiC particle size.

COMPARATIVE EXAMPLE I

As comparative examples, aluminum brake rotors (base Al was AC-4 material) were made of raw materials which comprises a base material of a mixture of 8 Vf % $TiO_2$, 12 Vf % SiC and 3 Vf % alumina short fibers in the same manner as making the example brake rotors. One of the raw materials contained a $CaCO_3$ additive. One of the raw materials which contained no $CaCO_3$ additive was subjected to solution hear treatment (T4 heat treatment) on condition that the raw material was water cooled after being kept at 520° C. for 4 hours, and another one, as cast material, of the raw materials which contained no $CaCO_3$ additive was not subjected to solution hear treatment. These comparative examples of brake rotors were subjected the same rubbing tests as for the example brake rotors in order to figure out the influence that the solution heat treatment exerted on the coefficient of friction $\mu$. The result is shown in FIG. 10.

Figure 10:
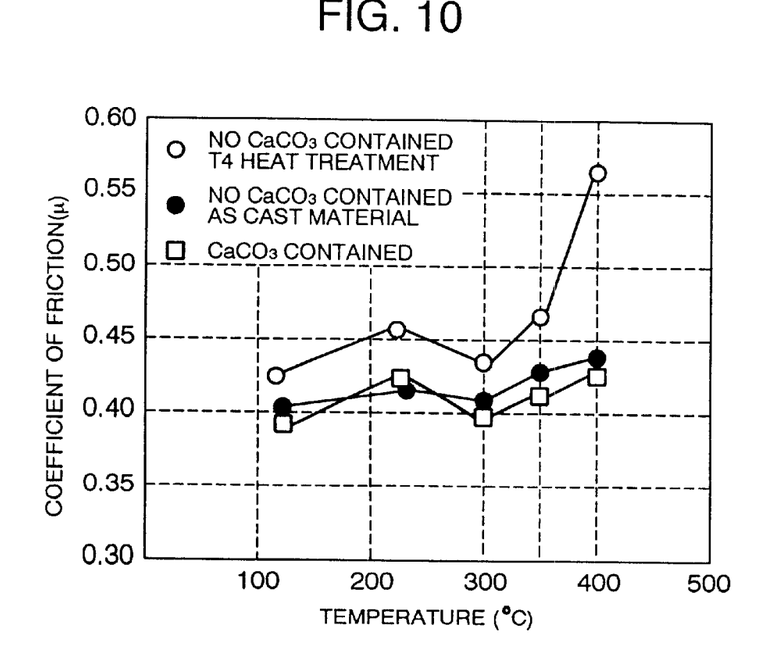
FIG. 10 is a graphical diagram showing the result of rubbing test at differing temperatures of a brake rotor of Comparative Example I.

As apparent from FIG. 10, it is demonstrated that applying heat treatment to the raw materials that contain no CaCO₃ additive is effective with respect to achieving increasing the coefficient of friction of the aluminum break rotor.

COMPARATIVE EXAMPLE II

As another comparative examples, aluminum brake rotors (base Al was AC-4 material) were made of a raw material which comprises a base material of a mixture of 8 Vf % $TiO_2$, 12 Vf % SiC and 3 Vf % alumina short fibers and a $CaCO_3$ additive in the same manner as making the example brake rotors. One of the comparative example aluminum break rotors were subjected to etching treatment after being buff-polishing. Both comparative example aluminum break rotors were subjected to rubbing tests in order to figure out the coefficient of friction $\mu$ during an initial period of sliding movement between the brake rotor and the brake pad. The result is shown in FIG. 11.

Figure 11:
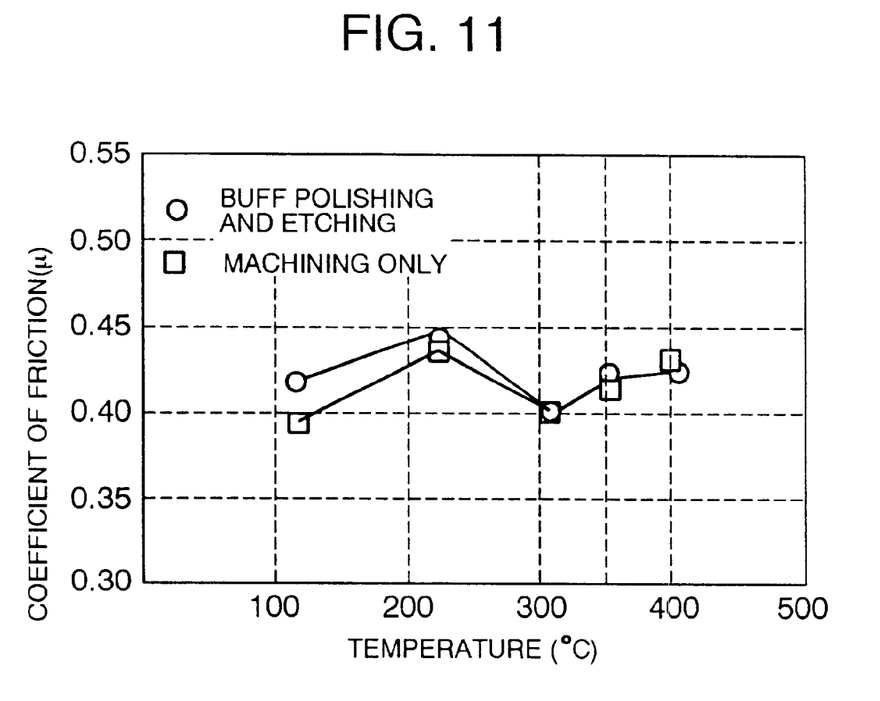
FIG. 11 is a graphical diagram showing the result of rubbing test at differing temperatures of a brake rotor of comparative Example II.

Referring to FIG. 11, it is revealed that the aluminum brake rotor after buff-polishing and etching achieves increasing the coefficient of friction in the initial period of sliding movement.

As described above, the partially composite lightweight meatal product of the present invention provides superior wear resistance and high strength while achieving increasing showing the coefficient of friction even if it has a relatively large size. Further, it is enabled to keep the sliding surface to remain even and smooth over a long period of time. In particular, the porous preform of the present invention provides the partially composite lightweight metal product as a material most suitable for a break rotor.

Although the present invention has been fully described by way of the preferred embodiments thereof with reference to the accompanying drawings, it is to be noted that various changes and modifications are apparent to those skilled in the art. Therefore, unless otherwise such changes and modifications depart from the true scope of the present invention, they should be construed as included therein.

What is claimed:

1. A porous preform which is made of a hard material and from which a partially composite lightweight metal products including at least a sliding surface as composite part is produced, said hard material comprising:

a sintered mixture comprising:
        $TiO_2$ particles;
        at least one of short ceramic fibers and whiskers; and
        SiC particles having an average particle size of approximately 20 to 100 $\mu$m, wherein said SiC particles are sintered in said $TiO_2$ particles in a form of sea-island structure.

2. A porous preform as defined in claim 1, wherein 2 to 20% in volume fraction of said $TiO_2$ particles are contained.

3. A porous preform as defined in claim 1, wherein 10 to 30% in volume fraction of said SiC particles are contained.

4. A porous preform as defined in claim 1, wherein said short ceramic fiber is adhered with said $TiO_2$ particles and said SiC particles.

5. A porous preform as defined in claim 1, wherein said whisker is adhered with said $TiO_2$ particles and said SiC particles.

6. A porous preform as defined in claim 1, wherein said porous preform is filled with a light alloy in continuous pores to form a partially composite lightweight metal product.

\* \* \* \* \*